United States Patent [19]

Boucher et al.

[11] Patent Number: 4,787,362

[45] Date of Patent: Nov. 29, 1988

[54] ABRASIVE BLADE HAVING A POLYCRYSTALLINE CERAMIC CORE

[75] Inventors: John N. Boucher, Longwood; David E. Bajune, Sanford, both of Fla.

[73] Assignee: Thermocarbon, Inc., Casselberry, Fla.

[21] Appl. No.: 178,787

[22] Filed: Apr. 1, 1988

Related U.S. Application Data

[63] Continuation of Ser. No. 920,533, Oct. 20, 1986, abandoned.

[51] Int. Cl.⁴ ............................................. B28D 1/04
[52] U.S. Cl. ................................ 125/15; 51/206 R
[58] Field of Search ............... 51/206 R, 207, 209 R; 125/13 R, 15, 18; 501/97

[56] References Cited

U.S. PATENT DOCUMENTS

| | | |
|---|---|---|
| 2,281,526 | 4/1942 | Milligan et al. . |
| 3,271,911 | 10/1964 | McKenna . |
| 3,640,027 | 2/1972 | Weiss .................. 51/206 R |
| 3,745,623 | 4/1973 | Wentorf, Jr. et al. . |
| 3,765,132 | 10/1973 | Mackey et al. .......... 51/206 R |
| 4,409,003 | 10/1983 | Sarin et al. . |
| 4,441,894 | 4/1984 | Sarin et al. . |
| 4,449,939 | 5/1984 | Sarin et al. . |
| 4,469,489 | 10/1984 | Sarin et al. . |
| 4,496,372 | 1/1985 | Almond et al. . |
| 4,505,721 | 3/1985 | Almond et al. . |
| 4,557,244 | 12/1985 | Allor . |
| 4,634,453 | 1/1987 | Hay et al. . |

Primary Examiner—Robert P. Olszewski
Attorney, Agent, or Firm—Armstrong, Nikaido, Marmelstein & Kubovcik

[57] ABSTRACT

An abrasive cutting blade having very high rigidity, has a core which is a disc of low porosity, polycrystalline structural ceramic and an abrasive material adhered to the periphery thereof. The structural ceramic may be conductive or non-conductive and the abrasive may be adhered by resin bonding, electroplating, sintering or pressing.

20 Claims, 4 Drawing Sheets

4,787,362

ABRASIVE BLADE HAVING A POLYCRYSTALLINE CERAMIC CORE

This application is a continuation of application Ser. No. 920,533 filed Oct. 20, 1986, now abandoned.

BACKGROUND OF THE INVENTION

1. Field of the Invention

This invention relates to abrasive cutting blades having a polycrystalline structural ceramic core, which are useful in the cutting or dicing of silicon wafers and other hard, and/or brittle materials. The cutting discs of this invention are particularly useful in the die-separation phase of the production of semi-conductor chips, magnetic heads and other components for use in the electronics industry.

2. Description of the Prior Art

In the die-separation or dicing stage of the production of microelectronic devices, silicon, ceramic or other exotic hard and brittle substances are sliced using an abrasive machining process analogous to other grinding and cut-off operations. The comparatively high cost of these substrates and the need for high accuracy in dicing makes it essential that the cutting blades be highly accurate so as to minimize waste of material and to minimize secondary finishing operations. The circular cutting blades also should be as thin as possible so that the kerf (width of the cut) is as thin as possible.

The blade used in the cutting process contains a large number of small, abrasive grains on the cutting surface. Typically, the abrasive grains are diamond particles, although other hard, natural and synthetic particulate materials may be used. The blades operate at high rpm, typically up to 50,000 rpm. To obtain trueness of cut and stability, and to minimize run-out (movement of the cutting edge out of the desired plane), the blades are typically mounted in a flange so that only a small cutting edge is exposed. The depth of cut using such a device is limited by the flexibility of the blade.

There are three basic types of dicing blades which are commerically available. The sintered blade has abrasive particles fused into a soft metal, such as brass or copper, or incorporated using a powdered metallurgical process. The plated diamond blade holds abrasive particles in a nickel bond produced by an electroplating process. The resinoid blade contains the abrasive particles in a homogeneous matrix of a resin, typically a thermosetting resin.

The core of the blade may be made of resin or metal or it may be made of a vitrified ceramic. U.S. Pat. No. 4,099,934 to Suzuki et al discloses a method for resin bonding an abrasive to a metal base. U.S. Pat. No. 4,385,907 to Tomita et al . discloses a resinoid bonded grinding wheel in which the support member is a vitrified ceramic. U.S. Pat. No. 4,446,657 to Asaeda et al discloses a method for resin bonding an abrasive to a porous, vitrified ceramic grinding wheel.

Vitrified clay-based, porous ceramic blade cores are more heat stable than metal blade cores but the width of the blade cannot be made as narrow as desired for minimal kerf without producing a blade which is too fragile. Also, it has been found that when the exposure of the cutting edge of the blade is increased to that necessary to cut through thicker materials, contact of the vitrified ceramic core of the blade with the substrate being cut results in catastrophic destruction of the blade.

SUMMARY OF THE INVENTION

The present invention is an abrasive cutting blade having a fine grain, polycrystalline, low porosity structural ceramic core and an abrasive cutting edge. The blade has superior rigidity when compared to cutting blades of the prior art. Applicants also have discovered that it is possible to adhere an abrasive material to the circumference of the polycrystalline ceramic core, which abrasive material is slightly wider than the width of the core. This allows a cut to be made which is slightly wider than the core, enabling deeper cuts to be made without risking contact of the ceramic core with the substrate being cut.

Applicants abrasive cutting blade produces deep, perpendicular cuts in hard, brittle substrates with a high degree of accuracy, which reduces the time required for lapping of the cut edge to true the final product.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE INVENTION

Figure 3:
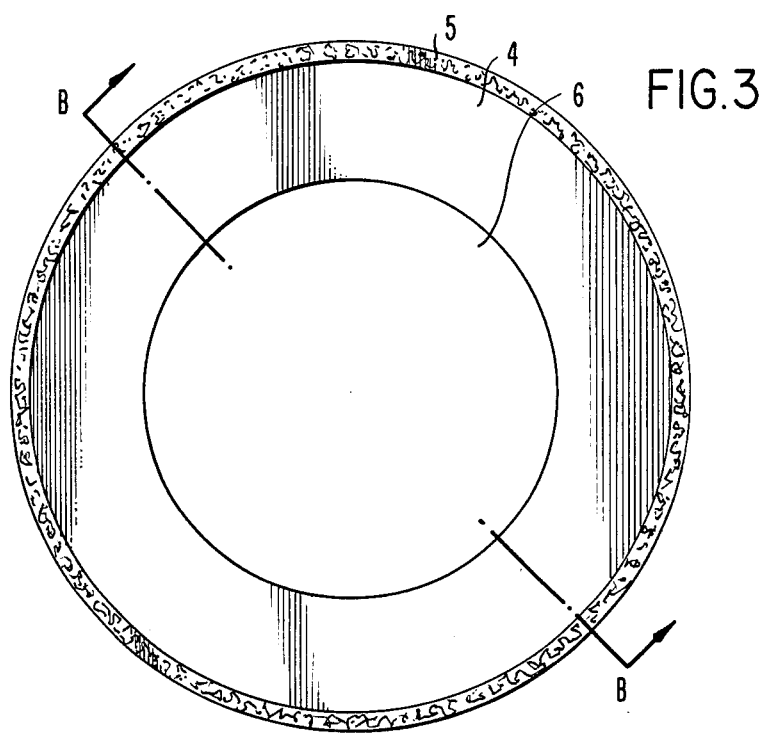
FIG. 3 is a plan view of the abrasive blade of this invention.
Figure 4:
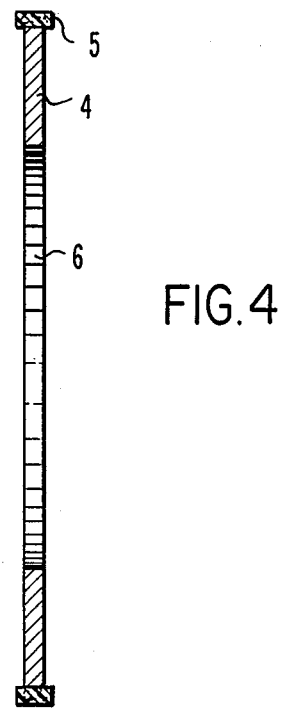
FIG. 4 is a section of this invention taken along line B—B.

This invention will be described by reference to the drawings. FIG. 3 is a plan view of the cutting blade of this invention. Core 4 is an annular disc formed from a low porosity, polycrystalline structural ceramic. An abrasive matrix 5 is firmly adhered to the circumference of disc 4. Hole 6 is provided for mounting to a flange and/or spindle. FIG. 4 is a cross-section of the abrasive cutting blade of this invention showing the comparative widths of the core and abrasive matrix.

Figure 1:
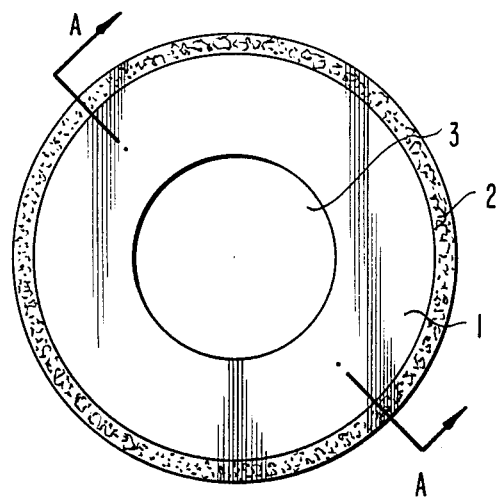
FIG. 1 is a plan view of a resin-bonded abrasive blade of the prior art.
Figure 2:
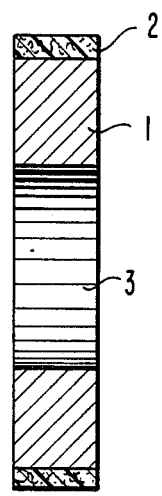
FIG. 2 is a section of FIG. 1 taken along line A—A.

FIG. 1 is a plan view of the prior art showing disc 1, abrasive 2 and mounting hole 3. FIG. 2 is a cross-section of the blade of FIG. 1, showing the relative widths of the disc and abrasive matrix. As can readily be seen from the comparison of FIGS. 2 and 4, applicants' blade has a cutting edge which is wider than the disc.

Figure 5:
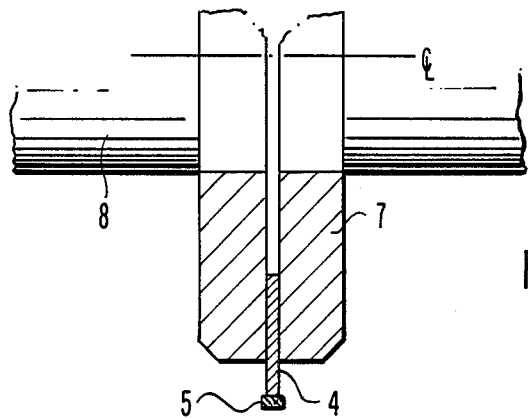
FIG. 5 shows the blade of this invention mounted in a flange or spacer.

FIG. 5 is a cross-sectional view of the cutting blade of this invention mounted upon a flange or spacer 7. A shaft or arbor 8 passes through the blade and flange. A flange is normally used when a single blade is used. Spacers or multiple flanges are used when a number of blades are ganged so that the multiple cuts may be made in the substrate. The exposure of the blade is defined as the distance from the circumference of the flange or spacer to the edge of the blade 5. The flange or spacer is required to maintain rigidity of the blade, especially very thin blades, and the wobble or run-out of a cutting blade is inversely proportional to the exposure. For a given exposure, run-out is proportional to the rigidity of the exposed portion of the blade.

Figure 6:
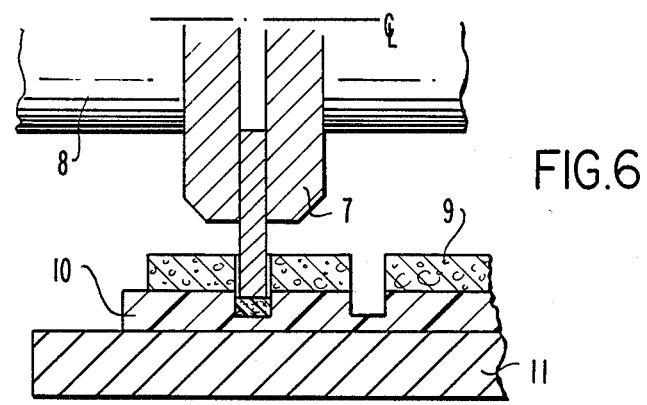
FIG. 6 depicts a blade cutting a substrate, showing blade, substrate and amount.

FIG. 6 shows a blade cutting a workpiece 9 which is mounted on an intermediate carrier 10, which carrier is attached to chuck 11. Frequently, it is desirable for the blade cutting edge to completely penetrate the workpiece and to cut at least a small portion away from the intermediate carrier. The importance of a highly rigid core is apparent from this figure. Run-out of the disc brings the core into contact with the workpiece. When an abrasive disc without a hard core is used, the result is a wider and less even cut. When an abrasive disc having a rigid core is used, the cut is more true, but any contact of core and workpiece results in damage to either the core or the workpiece, or both. The use of the highly rigid polycrstalline structural ceramic core minimizes run-out, and the relief provided between the lateral surface of the abrasive cutting edge and the side of the core further insures that contact between the core and the workpiece will not occur.

The cutting blade of this invention has a core formed from a polycrystalline ceramic. The ceramic is a "modern" or "advanced" structural ceramic, as contrasted with clay based, vitreous ceramics which have a glassy phase. The ceramic is formed from small particles of inorganic materials, usually by pressing the powders together. Typically, the ceramic is fused or bonded by sintering. The ceramic has a final density which is close to the theoretical density of the material. Typical porosities are 1 percent or less. The ceramics useful in this invention have a Young's Modulus of Elasticity of $30 \times 10^6$ psi or greater.

The ceramic may be non-conductive or conductive, and non-conductive ceramics may be made conductive by coating the ceramic with a conductive material. The ceramics are characterized by a discontinuous crystalline phase and have no free metallic phase. The ceramic may be formed from the powders of a single chemical species, usually having a high purity, or two or more materials may be mixed before forming to obtain the structural characteristics required. Small amounts of organic resins also may be included, provided that the final fused material maintains the required Young's Modulus of Elasticity.

The powders used to form the ceramic core of this invention are typically oxides, nitrides, borides, and carbides. Non-conductive ceramics include the oxides $Al_2O_3$, $BeO$, $MgO$, $ThO_2$, and $MgAl_2O_4$, certain carbides such as $SiC$ and nitrides such as $Si_3N_4$. Conductive ceramics include the carbides of tungsten and titanium.

Figure 7:
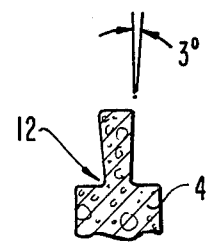
FIG. 7 is a detail of one embodiment of the peripheral edge of the ceramic core in sectional view.
Figure 8:
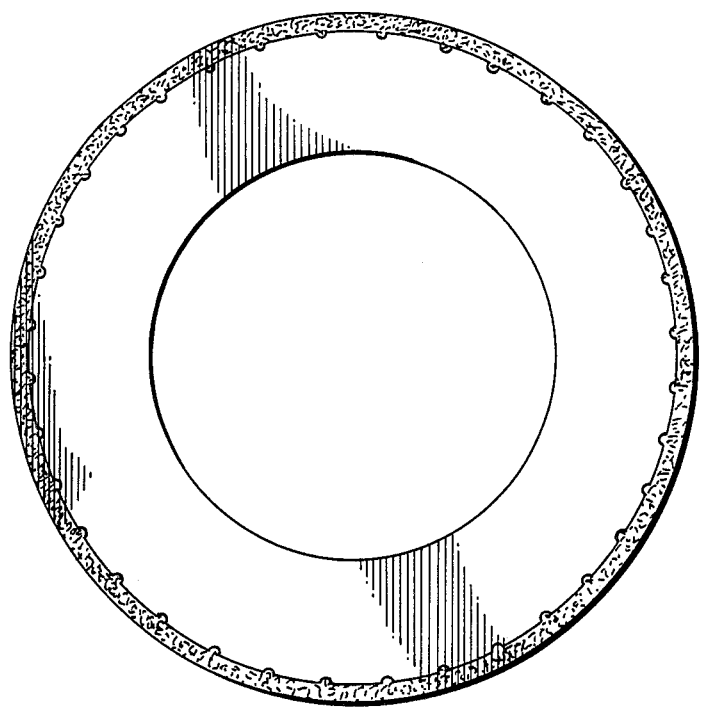
FIG. 8 depicts a blade wherein the abrasive material fills notches in the outer peripheral surface.

The ceramic may be formed by any method known to those skilled in the art. The core may be formed in a disc shape or in flat sheets. The final size and shape is obtained by cutting and, if necessary, machining the ceramic. A preferred method for cutting the disc from a sheet of ceramic is by use of a laser. The outer edge may be shaped to provide a surface which enhances the bonding of an abrasive. For example, as shown in FIG. 7, the circumference may be machined to provide a raised middle portion with one or more steps 12 toward the edge. Preferably, the raised middle portion is wider at its outer end than at its base. Additionally, or alternatively, a plurality of notches may be cut into the periphery (FIG. 8). The treatment of the circumference provides greater surface area for adhering of the abrasive and also allows a mechanical locking of the abrasive to the ceramic core.

Next, an abrasive material is applied to the edge of the core. The abrasive may be applied by sintering in a powdered metalurgical process or it may be applied by an electroplating process. Both of the above processes produce a comparatively hard abrasive portion. It is also possible to incorporate the abrasive as a separate ceramic layer applied to the core portion. This may be done in a separate pressing and sintering step, or the abrasive-containing ceramic may be applied when the core is in the "green" state. The abrasive material may also be pressed onto the core. When a highly conductive blade is required, the bonding matrix material may be a metal in which abrasive particles are embedded and the abrasive material may be adhered to the core by any suitable bonding process.

In a first preferred embodiment, the abrasive cutting edge is a resin matrix containing a large number of abrasive particles. Diamond particles are preferred, although silicon carbide, borozon (BN), aluminum oxide and other very hard particulate abrasives have application in the industry.

The resin matrix may be a thermosetting phenol, an epoxide, a polyester, a polyamide, a polyimide or a polycarbonate. The choice of the resin is determined primarily by the temperature range over which the matrix is expected to operate and the hardness of the resin which is desired, as well as by the ability of the resin to bond to the ceramic. The stepping or notching of the ceramic core on its circumference helps to lock the resin to the core material and prevent rotation of the core relative to the abrasive-containing matrix.

In a preferred method for applying the resin matrix to the core, the periphery of the core is cleaned, such as by sandblasting and/or washing with a volatile solvent prior to application of the resin bonded abrasive. The cleaned core is placed in a mold, the mold is loaded with a mixture of abrasive and resin around the edge of the core, and the mold is closed. For thermosetting resins, the mold is then placed in a heated press, and pressed while heating until the resin has set.

The cutting blade is removed from the mold after the resin has set and the blade is trued to obtain the final abrasive edge configuration.

Depending upon the resin matrix used, it may be advantageous to precoat the edge of the core with resin prior to addition of the abrasive-containing resin. Precoating assists in the formation of a tight bond to the core.

In a second preferred embodiment, a conductive core, such as tungsten carbide is formed by cutting and machining. A ring of metal containing abrasive particles may be machined to exactly fit around the periphery of the core and lightly pressed onto the core. The metal ring is preferably formed from nickel, brass, copper or bronze, depending upon the desired hardness. The core and abrasive material are then joined by welding, brazing or soldering. Soldering using a high temperature solder such as 'silver solder' is especially preferred. The blade may then be trued in a final machining step.

The cutting blade of this invention is further described by the following examples, which are not limiting of includes those modifications which may be apparent to those skilled in the art.

EXAMPLE 1

A sheet of non-porous, polycrystalline structural ceramic containing at least 94% aluminum oxide and having a thickness of 0.0205 inches (20.5 mils) was cut using a laser and finish ground to form a core having an inner diameter of 2.75 inches and an outer diameter of 4.4 inches. Thirty-six notches, each approximately 0.05 inches deep, were cut at even intervals around the circumference. The core was sandwiched between two metal hubs with the outer edge exposed, lightly sandblasted and washed with acetone. Furfural was painted onto the cleaned edge and the wet edge was rolled in powdered phenolic resin. After the precoat resin had set, the core was removed from the hubs and placed in a mold exposing the edge to be coated. A mixture of thermosetting phenolic resin and diamond particles having a particle size of 54 microns (270–320 U.S. mesh) was loaded into the mold along the edge of the ceramic core and the mold was closed. The mold was placed in a heated press and the press closed. After the resin had set, the mold was removed from the press, and allowed to cool. The blade was removed from the mold and trued to obtain a blade having an outer diameter of 4.5 inches and a cutting edge width of 22.5 mils.

EXAMPLE 2

A sheet of low porosity polycrystalline structural ceramic, tungsten carbide, which was molded and fired to rough dimensions, is machined and ground to a thickness of 0.020 in. (20 mils) to form a core having an inner diameter of 2.750 in. and an outer diameter of 4.400 in., the peripheral surface being flat. The core is mounted in a jig and a brass ring having an inner diameter of 4.404 in., an outer diameter of 4.510 in. and a thickness of 0.026 in. in which diamond particles having a particle size of 54 microns are embedded is lightly pressed onto the core and attached by laser welding. The blade is trued to obtain a blade having an outer diameter of 4.5 inches and a cutting edge width of 24 mils.

EXAMPLE 3

The blade produced according to Example 1 was mounted in a flange and used to make multiple slices in a 2 inch by 2 inch sheet of alumina titanium carbide 0.160 inches thick mounted on a graphite plate. The feed rate was 1 inch per minute and the blade was operated at a set speed of 6,000 rpm. A cut was made to a depth of 0.040 inches below the workpiece. Multiple cuts were made and the thickness of each strip was measured at the top and bottom of the strip using a micron micrometer. Ten distances were measured, five at intervals across the top surface and five at comparable intervals across the bottom surface. Table 1 illustrates a representative set of measurements. The spread indicates the difference between the maximum and minimum distances measured at the top and at the bottom across the workpiece and the maximum and minimum differences between the width at top and bottom at each section along the cut strip.

COMPARATIVE EXAMPLE 1

A resin-bonded blade having no separate core, an outside diameter of 4.5 inches, an inside diameter of 2.75 inches, a thickness of 28.5 mils and a diamond particle size of 64 microns was mounted in a flange and the above-described test repeated using a set speed of 7,400 rpm. Table 2 illustrates typical results for an experiment using a coreless resin-bonded blade.

COMPARATIVE EXAMPLE 2

A diamond resin-bonded blade having a metal core and outer diameter of 6 inches and a width of 23 mils was subjected to the above-described test using a set speed of 2,989 rpm and a feed rate of 0.23 inches/min. (Blade speed and workpiece feed rates are adjusted to optimal conditions for the type of blade and abrasive being used) Table 3 illustrates results of a typical experiment performed using this type of blade.

TABLE 1

|  | Bar thickness at top of bar (um) | Bar thickness at bottom of bar (um) | Difference (um) |
| --- | --- | --- | --- |
|  | 911.00 | 911.00 | 0.00 |
|  | 910.00 | 910.00 | 0.00 |
|  | 909.00 | 910.00 | 1.00 |
|  | 909.00 | 910.00 | 1.00 |
|  | 910.00 | 909.00 | 1.00 |
| Maximum | 911.00 | 911.00 | 1.00 |
| Minimum | 909.00 | 909.00 | 0.00 |
| Average | 909.80 | 910.00 | 0.60 |
| Spread | 2.00 | 2.00 | 1.00 |

TABLE 2

|  | Bar thickness at top of bar (um) | Bar thickness at bottom of bar (um) | Difference (um) |
| --- | --- | --- | --- |
|  | 872.00 | 875.00 | 3.00 |
|  | 871.00 | 874.00 | 3.00 |
|  | 866.00 | 870.00 | 4.00 |
|  | 862.00 | 866.00 | 4.00 |
|  | 855.00 | 858.00 | 3.00 |
| Maximum | 872.00 | 875.00 | 4.00 |
| Minimum | 855.00 | 858.00 | 3.00 |
| Average | 865.20 | 868.60 | 3.40 |
| Spread | 17.00 | 17.00 | 1.00 |

TABLE 3

|  | Bar thickness at top of bar (um) | Bar thickness at bottom of bar (um) | Difference (um) |
| --- | --- | --- | --- |
|  | 1373.00 | 1387.00 | 14.00 |
|  | 1370.00 | 1375.00 | 5.00 |
|  | 1366.00 | 1370.00 | 4.00 |
|  | 1369.00 | 1379.00 | 10.00 |
|  | 1363.00 | 1392.00 | 29.00 |
| Maximum | 1373.00 | 1392.00 | 29.00 |
| Minimum | 1363.00 | 1370.00 | 4.00 |
| Average | 1368.20 | 1380.60 | 12.40 |
| Spread | 10.00 | 22.00 | 25.00 |

The spread between top and bottom of the cut bar indicates the trueness of the cut. This is an indication of the degree of run-out or wobble as the blade cuts through the substrate material. The higher number indicates a greater degree of wobble or unevenness in the cut. Typical industry standards for this application for cut thickness are 0.024–0.030 mils and a depth of 0.160 inches. Cuts with excessive unevenness must be ground or lapped to be trued.

The data reported above indicate that a cutting blade formed in accordance with this invention provides a truer cut than that which is attainable with blades of the prior art. A true cut results in the elimination of subsequent machining and minimal loss of expensive composite materials.

It is readily apparent that the above-described abrasive cutting disc meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. An abrasive dicing blade comprising:
   an annular disc less than 0.025 in. in thickness, said disc having an inner and an outer diameter, and being formed from a fine grain, low porosity, polycrystalline, non-conductive, structural ceramic, and
   an abrasive material, which is a polymerized resin matrix in which abrasive particles are embedded, adhered to an outer peripheral surface of said annular disc, said abrasive material having a thickness greater than the thickness of said annular disc.

2. An abrasive dicing according to claim 1 wherein said abrasive material contains diamond particles.

3. An abrasive dicing blade according to claim 1 wherein said abrasive material contains silicon carbide particles.

4. An abrasive dicing blade according to claim 1 wherein said abrasive material contains boron nitride particles.

5. An abrasive dicing blade according to claim 1 wherein said abrasive material contains aluminum oxide particles.

6. An abrasive dicing blade according to claim 1 wherein said polymerized resin matrix is a thermosetting phenolic.

7. An abrasive dicing blade according to claim 1 wherein said polymerized resin matrix is an epoxide.

8. An abrasive dicing blade according to claim 1 wherein said polymerized resin matrix is a polyimide.

9. An abrasive dicing blade according to claim 1 wherein said ceramic disc has a Young's Modulus of Elasticity equal to or greater than $30 \times 10^6$ psi.

10. An abrasive dicing blade according to claim 1 wherein said non-conductive cermaic is aluminum oxide.

11. An abrasive dicing blade according to claim 1 wherein said non-conductive ceramic is silicon carbide.

12. An abrasive dicing blade according to claim 1 wherein said non-conductive ceramic is silicon nitride.

13. An abrasive dicing blade according to claim 1, wherein said non-conductive ceramic is coated with a conductive material.

14. An abrasive dicing blade according to claim 1 wherein the width of said abrasive material is greater than the width of said ceramic disc.

15. A method for making an abrasive dicing blade comprising:
   (a) forming a disc less than 0.025 in thick of fine grain, low porosity, polycrystalline, non-conductive, structural ceramic, said disc having an inner and outer diameter;
   (b) adhering an abrasive material which is a polymerized resin matrix in which abrasive particles are embedded to an outer circumferential periphery of said disc.

16. A method according to claim 15 further comprising forming at least one step on each side of the outer circumferential periphery of said ceramic disc.

17. A method according to claim 15 further comprising forming a plurality of notches in the periphery of said ceramic disc.

18. A method according to claim 15 wherein said disc of structural ceramic is formed by cutting a disc from a sheet of structural ceramic.

19. A method according to claim 15 wherein said abrasive material is adhered to said ceramic disc by adhesive bonding.

20. A method according to claim 15 wherein in said abrasive material comprises abrasive hard particles in a polymeric resin and the resin is adhered to the outer peripheral circumference of said ceramic disc by molding said abrasive material on said ceramic disc.

* * * * *